INVENTOR.
RICHARD A. MARSHALL,
BY
ATTORNEY.

United States Patent Office
3,369,001
Patented Feb. 13, 1968

3,369,001
VINYL-MODIFIED LINEAR POLYAMIDES
Richard A. Marshall, Baytown, Tex., assignor to Esso Research and Engineering Company
Continuation-in-part of application Ser. No. 286,643, June 10, 1963. This application Sept. 19, 1966, Ser. No. 584,309
6 Claims. (Cl. 260—78)

ABSTRACT OF THE DISCLOSURE

This application discloses vinyl-modified linear polyamides, specifically a polyamide made up of adipic acid, β-vinyladipic acid and hexamethylene diamine having the following formula:

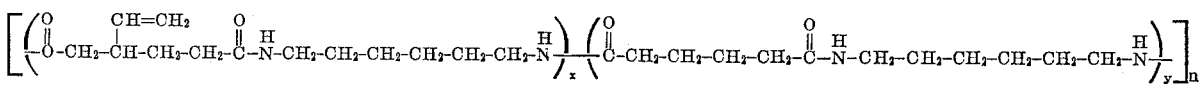

where $x$ is from 2 to 50 and $y$ is from 98 to 50, $n$ being from 50 to 120.

The polyamide of the present invention may be used as a fiber (for example, as tire cord) or in the production of molded articles.

This application is a continuation-in-part of my copending application Ser. No. 286,643, filed June 10, 1963, now abandoned.

The present invention relates to vinyl-modified linear polyamides. More specifically, the present invention relates to linear polyamides formed of diacids and primary diamines and having pendant vinyl substituents in the acid moiety of some repeating groups. Generically, the polyamides of the present invention will be referred to as vinylnylons. In its most specific aspect, the present invention relates to a vinylnylon formed of adipic acid, β-vinyladipic acid and hexamethylene diamine.

Linear polyamides are formed by the reaction of dicarboxylic acids with primary diamines, generally on an equimolar basis, followed by dehydration. The molecular weight is controlled by using either the acid or the amine in excess, or by using a predetermined amount of a monofunctional acid or amine, e.g., acetic acid or methyl amine. Both terminal moieties of the chain consequently may be of the same type, that is, each terminal group will be determined either by the compound present in excess or by the monofunctional compound. However, the acid and amine are nevertheless in substantially equimolar proportions, and the terminology "equimolar" will be used hereinafter as referring both to exact equimolar proportions or the product obtained by using either one reactant in excess or addition of a monofunctional acid or amine.

Nylon 66, formed of adipic acid and hexamethylene diamine, has achieved great commercial success as a synthetic fiber. This fiber has been widely used as a tire cord, but suffers from several deficiencies, among which are poor adhesion of the cord to the tire rubber and the tendency of the cord to deform and form flat spots when an automobile having such tires stands stationary overnight. This is due to a phenomenon called "creep," the tendency of the adjacent molecule chains of the nylon to move relative to each other when under stress. Further, nylon 66 is a thermoplastic material and cannot be thermoset. The present invention provides linear polyamides (similar to nylon 66) with pendant vinyl groups which may be used for cross-linking, either with other nylon chains or with the molecular chains of rubber or other polymers. Thus, better adhesion characteristics, less "creep," thermosetting properties, and increased tensile strength are provided which make the modified vinylnylon 66 high useful for cords in tires and the like, or for use in the production of molded articles. For examples, a vinylnylon 66 woven cord may be used in a tire having a butyl rubber body and/or butyl rubber tread.

The prior art polyamide repeating unit is generally linear, containing an acid moiety and a diamine moiety suc has "unmodified" nylon 66:

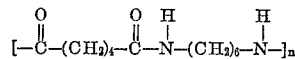

The number of repeating units, indicated by $n$, may range from 50 to 120. A suitable value for $n$ is about 100.

β-Vinyladipic acid has been prepared by ozonolysis and oxidation of vinyl cyclohexene. See U.S. Patent 3,202,-704, issued to Dr. Robert H. Perry, Jr. In the present invention, preferably from 2 to 50% of the acid moiety is β-vinyladipic acid. The resulting polymer has the following formula:

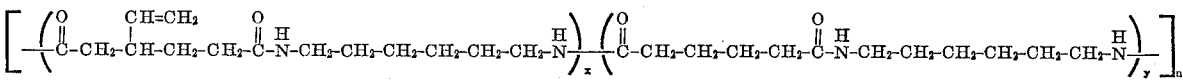

where $x$ is from 2 to 50 and $y$ is from 98 to 50, $n$ being from 50 to 120. This can more conveniently be expressed in terms of the relative proportions of the acids and diamine, and this simpler method will be hereinafter employed:

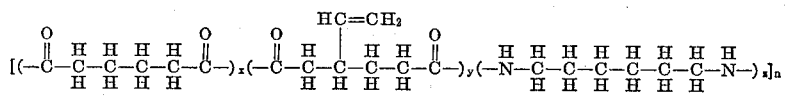

wherein $(x+y)$ is substantially equal to $z$;
$x$ is from 50 to 98% of $(x+y)$;
$y$ is from 2 to 50 of $(x+y)$; and
$n$ will be sufficiently large to denote the solid product and, as hereinbefore stated, can suitably range from 50 to 120.

It has been proposed (U.S. Patent 2,174,619) that the prior art nylons be modified to include unsaturation, but that intention dealt with unsaturation which involved "backbone" carbon atoms and yielded a polyamide which was not intended for use as a fiber. "Backbone" unsaturation is less desirable because degradation at the unsaturation causes a reduction in molecular weight of the polymer chain.

Hersberger et al. (2,482,526) disclose a wetting agent obtained by reacting hexamethylene diamine with alkyl or alkenyl substituted succinic and succinamic acids, but do not disclose a polymer employing both a diacid and a vinyl diacid reacted with the diamine.

From an examination of the structural formulae of the modified vinylnylons of the present invention, it can be seen that the pendant vinyl groups present an unsaturated functionality not involving a backbone carbon atom, suitable for further reactions such as cross-linking. This type of function is entirely absent from the prior art linear polyamides.

The β-vinyladipic acid is used along with adipic acid in order to control the degree of "modification" of the nylon (i.e., the statistical average number of vinyl pendant groups per nylon repeating unit). The mole ratio of the β-vinyladipic acid to the adipic acid will determine the number of vinyl groups pendant from the nylon chain. Thus, for a ratio of 2 moles of β-vinyladipic acid per 98 moles of adipic acid, two vinyl groups will be introduced per 100 repeating units in the nylon chain (since each repeating unit contains one acid moiety). This is referred to as a 2% vinylnylon.

PROCESS

The modified vinylnylons of the present invention may be produced in a number of ways. Where more than about 50% of the repeating units contain a pendant vinyl group, the polyamide product is prone to cross-link under temperature conditions such as those employed in dehydration. Thus, salt formation and dehydration are utilized only where less than 50% modification is to be accomplished.

SALT FORMATION AND DEHYDRATION

Where less than 50% modification of the polyamide is desired, formation of the diammonium salt followed by dehydration is the preferred method of obtaining vinylnylon. As aforesaid, where greater than 50% modification is attempted, the nylon product tends to cross-link, and this process can be used in such case only by rigorously excluding oxygen from the reaction zone. Otherwise, cross-linking will occur during the dehydration step.

Salt formation is accomplished by reacting the β-vinyladipic acid and adipic acid (in the desired proportions) with hexamethylene diamine to obtain the diammonium salt. (Preferably, the β-vinyladipic acid will constitute from 2 to 50% of the total acid moiety of the polymer product.) The resulting diammonium salt is then subjected to dehydration to obtain the nylon product.

For example, 10 moles of vinyladipic acid, 40 moles of adipic acid, and 50 moles of hexamethylene diamine may be reacted in order to obtain a 20% modification of nylon 66, having a structural formula as shown in Example 5.

The salt formation may be accomplished at any desired pressure and at temperatures from about 0° C. to the boiling point of the solvent, e.g. 100° C. It is preferred to operate at atmospheric pressure and room temperature in order to simplify equipment requirements. Disregarding the adipic acid for clarity, the reaction may be represented schematically as:

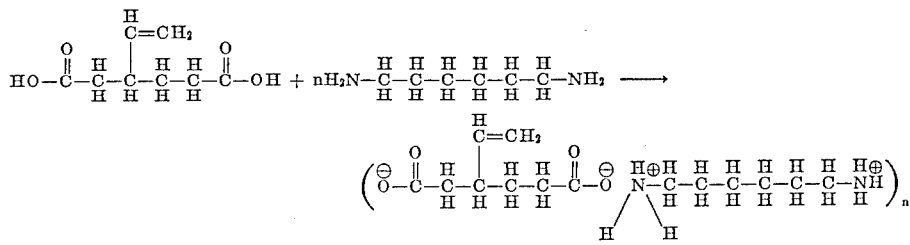

The hexamethylene diammonium β-vinyladipate, which is the intermediate salt product, is then converted to the nylon by heating to the fusion temperature, suitably in the absence of oxygen. The fusion temperature is from about 180° C. to about 300° C. The dehydration preferably is initiated at high pressures such as 300 p.s.i.g., and concluded under reduced pressure, such as 0 p.s.i.g. The pressure at conclusion may be reduced below atmospheric pressure, to about 0.1 millimeter of mercury absolute. The conversion of the salt is accomplished by the elimination of water, as shown below:

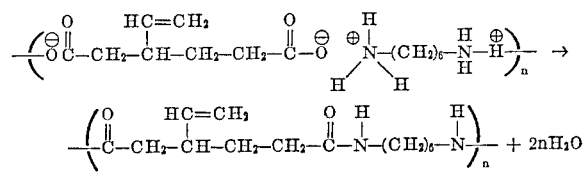

Suitable diluents and promoters may be used in both the amidification and conversion steps. For example, in the salt-forming step, an alcohol solvent may be used as a diluent in widely varying amounts, preferably constituting from 50 to 90 weight percent of the reaction mixture. Alkanols such as methanol, ethanol, propanol, isopropanol, etc., or aromatic alcohols may suitably be employed. Another suitable solvent for the salt formation step is a mixture of alcohol and water (80 to 90 mole percent alcohol).

Dehydration of the salt is preferably accomplished in the presence from about 5 to 35 weight percent of added water. The presence of the water appears to aid in the dehydration of the diammonium salt.

ACID CHLORIDE REACTION

Vinylnylons may also be made by preparing the respective acid chlorides for reaction with the diamine. Under these conditions, the acid chlorides and the diamine combine directly with evolution of hydrogen chloride to produce the nylon without a subsequent step.

The preparation of the acid chloride may be accomplished in the following manner. The β-vinyladipic acid and adipic acid may be reacted with a compound such as phosphorus pentachloride or thionyl chloride to obtain the respective diacid chlorides. This reaction suitably may be accomplished by refluxing in thionyl chloride or $PCl_5$ in benzene at atmospheric pressure. The phosphorus pentachloride or thionyl chloride will suitably be used in a stoichiometric excess in order to assure complete conversion of the carboxyl groupings of the diacids to the acid chloride.

The diacid chlorides are then reacted with the diamine to produce the polymer without requiring dehydration of the salt. This reaction may be accomplished using essentially stoichiometric amounts of diacid chloride and the diamine, at a temperature of about 0° C. to 100° C. and atmospheric pressure. Thus, the higher temperatures are avoided and cross-linking of the polymer is not suffered.

The properties of the vinylnylons of the present invention may be illustrated by vinylnylon 66, which is produced by replacing from 2 to 100% (preferably, 2 to 50%) of the adipic acid with β-vinyladipic acid. By reference to FIG. 1, wherein the stress-strain curves on the unoriented films are set forth, it is seen that inclusion of as little as 2% β-vinyladipic acid dramatically increases the tensile strength of nylon 66 and reduces the stretching tendency thereof. In the 100% vinylnylon, the stress-strain curve is much lower than the unmodified nylon, indicating greater stretching. Thus, the tensile strength and resilience of the nylon may be controlled by the degree of vinyl modification. Note that the 2% and 5% vinylnylons exhibit characteristics superior both to nylon 66 and to 100% vinylnylon.

The adhesion characteristics of the modified nylons are compared with those of unmodified nylon in FIGS. 2 and 3. In FIG. 2, β-vinylnylon 66 (100% modified) is seen to have about ten times the adhesion to butyl rubber as is obtained with unmodified nylon 66. With 2% and 5% modification, from 2 to 3 times the adhesion obtainable with unmodified nylon 66 is obtained.

FIGS. 2 and 3 are more fully discussed in Example 8, infra.

*Example 1*

Figure 1:
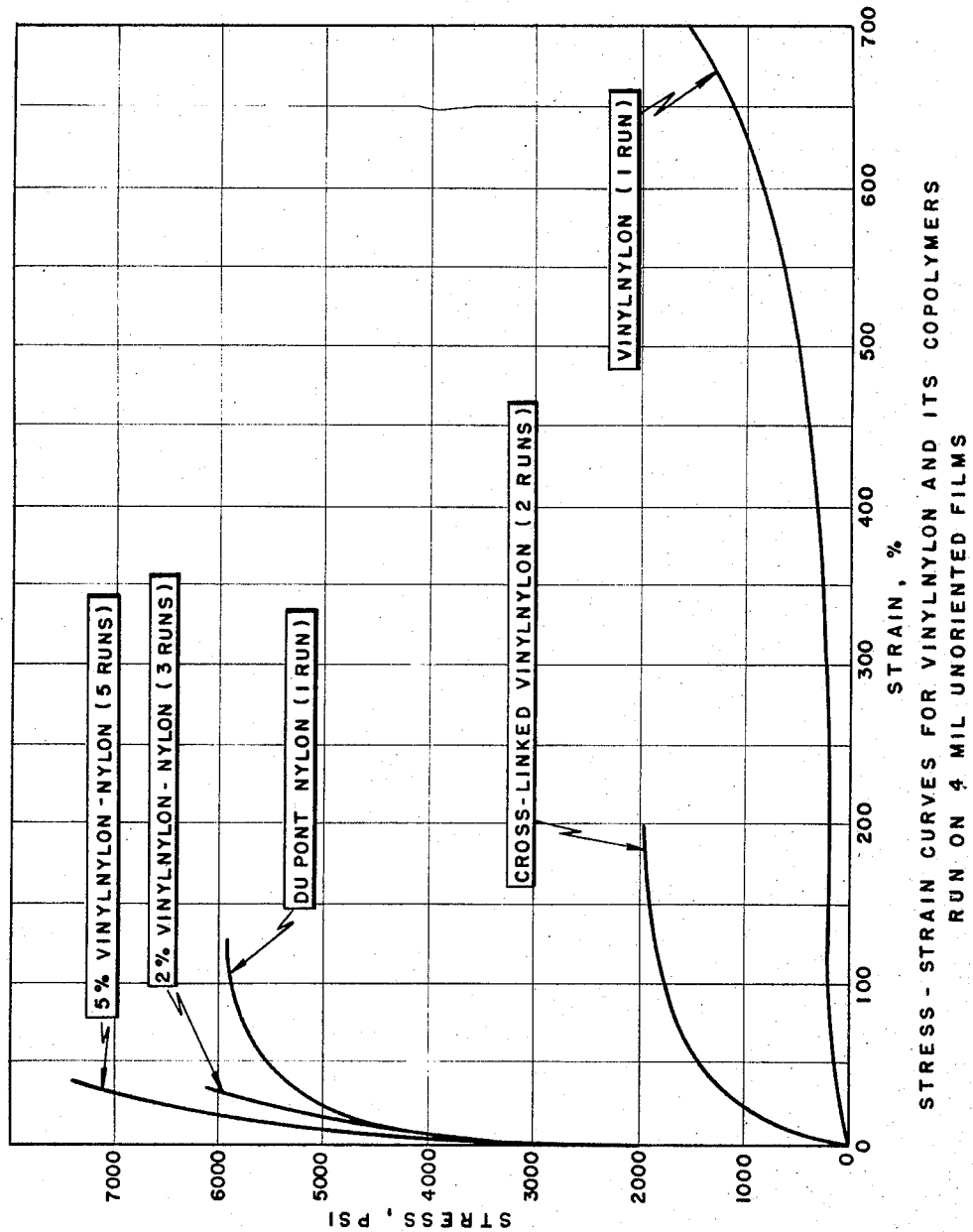

Preparation of β-vinyladipic acid. (See U.S. Patent 3,202,704, Dr. Robert H. Perry, Jr.) One-half mole, 54 g., of 4-vinylcyclohexene, which had been prepurified to remove peroxides, was ozonized in solution with 450 ml. of acetone by passing 0.08 cu. ft./min. of gas containing about 3.5 weight percent ozone through the solution at −78° C. until 260 liters of exit gas were indicated. This was an indication that 0.25 mole of ozone had been absorbed. The solvent was removed under reduced pressure, leaving 54.2 g. of a peroxidic gel. The gel was slurried with 150 ml. of acetone and 100 ml. of methanol, and subsequently added along with 100 ml. of water to a vessel fitted with a stirrer. The mixture was heated to boiling and a large portion, 184 ml. of the acetone and methanol, was distilled off. At 70° C. vapor temperature and 78° C. pot temperature, the distillation was stopped and the mixture cooled to 25° C. Silver oxide, 10 g., and 50 ml. of methanol were added to the vessel, and a reflux condenser was attached thereto. Oxygen at the rate of .02 cu. ft./min. was passed through the stirred suspension. After 5 minutes, addition of a solution of 20 g. of sodium hydroxide and 50 ml. of water was begun. This addition was accomplished dropwise over a period of 1–1.4 hours, while the temperature of the suspension was maintained at 30° C. to 35° C. by means of a cooling bath. The pH was maintained between pH 10 and pH 12. Oxygen was passed through the suspension for a period of 15 minutes after the addition of the sodium hydroxide solution was complete, after which the suspension was filtered and the filtrate acidified to a value of pH 2. The volume of solution was reduced to one-half by vacuum distillation, and the solution was then extracted with six 100 ml. portions of ether. The organic solutions resulting from the extraction were evaporated under reduced pressure to give 42.2 g. of non-volatile residues. A small sample of this crude residue was converted, using diazomethane, to methyl esters and the methyl esters separated by partition chromatographic means using an Apiezon "L" microcrystalline wax substrate on firebrick support. Based on these data, the selectivity of the reaction to β-vinyladipic acid was calculated to be 89.5%. This general procedure was repeated several times with selectivities being 80% to 90% for vinyladipic acid.

A sample of the crude acidic product which was in the form of a mushy solid was placed on a clay plate and allowed to stand until hardened. The melting point of the product so dried was between 80° C. and 82° C. It was in the form of a yellowish solid which was soluble in water, acetone, ether and chloroform, and insoluble in carbon tetrachloride. Decolorization using Nuchar (activated carbon) was more effective in aqueous media than in organic media although removal of the last traces of color was difficult. The melting point of the purest product obtained was between 81° C. and 82° C.

Analysis of this solid acid showed that it was 2-vinyl-1,4-butane-dicarboxylic acid, or β-vinyladipic acid.

*Elemental analysis.*—Calc'd for $C_8H_{12}O_4$: C, 55.80; H, 7.03. Found: C, 55.93, 56.05; H, 7.13, 7.26.

*Neutral equivalent (N. e.).*—Calc'd: 86.1. Found: 87.0.

Qualitative tests showed the presence of olefinic unsaturation. The compound reacted instantaneously with potassium permanganate precipitating manganese dioxide, and it decolorized bromine in an aqueous system.

The acid possessed infrared absorption bands at 10.0 and 10.8μ (vinyl group), 6.1μ (olefinic band), 5.8μ (carbonyl) in addition to other absorptive bands expected of this compound. The NMR spectra were in complete accord with the structure: β-vinyladipic acid.

Finally, β-vinyladipic acid was converted using ozonolysis in a methanol solvent, followed by oxidation with hydrogen peroxide in formic acid to give as the only nonvolatile product, 1,2,4-butanetricarboxylic acid; M.P. 123–124° C. Mixture M.P. with an authentic sample was not depressed.

The structural formula of the product is:

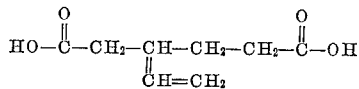

*Example 2*

A 2%-modified vinylnylon containing 2% β-vinyladipic acid was prepared by first distilling 118 g. (1.02 moles) of hexamethylene diamine. A solution of 3.4 g. (0.2 mole) of β-vinyladipic acid and 143.2 g. (0.98 mole) of adipic acid in 1300 ml. of absolute ethanol was prepared and filtered with a suction filter. To the solution of adipic acid and ethanol was added quickly the hexamethylene diamine in solution in 200 ml. of absolute ethanol. The resulting mixture was stirred for 5 hours and allowed to stand overnight. Reaction temperature was about 60° C. to 70° C. maximum. The reaction mixture was filtered, washed with two washes of 200 ml. each of cold absolute ethanol and pressed with a rubber dam. The cake was then dried in a vacuum oven overnight at 90° C. The dried solid weighed 257.54 g., representing 98% yield of the nylon salt.

A glass liner was charged with 100 g. of the 2% vinylnylon salt and 50 ml. of distilled water and placed in an autoclave. The reactor was flushed with nitrogen five times at 250 p.s.i. Finally, heat was applied to the reactor under 250 p.s.i. nitrogen pressure to bring the temperature to 525° F. for 4 hours. The pressure was maintained at 250 p.s.i. during this time by means of a back pressure regulator. The pressure was then released slowly over a period of 2.5 hours, the temperature being maintained at 525° F. for an additional half hour after a nitrogen flush at 250 p.s.i.

The 2% hexamethylenediammonium β-vinyladipate was converted to the vinylnylon, the polymer plug weighing 85.68 grams. The polymer was broken up with a hammer and pulverized in a Wiley mill. The molecular weight was then determined by viscometry in formic acid solvent at 25° C. to be about 20,000. The melting point was about 266° C. The solid linear polyamide product had the formula:

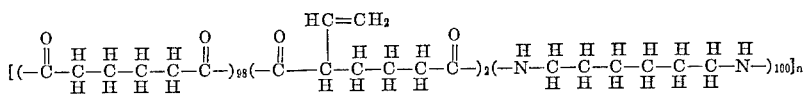

*Example 3*

The same procedure set forth in Example 2 was followed in the preparation of a 5% modified vinylnylon. In this run, 8.6 g. of β-vinyladipic acid and 138 g. of adipic acid in solution in 1100 ml. of absolute ethanol were charged to the flask, and 118.4 g. of hexamethylene diamine in 200 ml. of absolute ethanol were added. The proportions chosen yielded 5-mole percent modified vinylnylon. The dried salt weighed 265.4 g. The solid linear polyamide product had the formula:

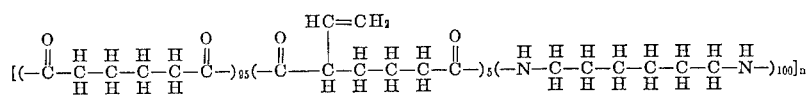

The molecular weight of the vinylnylon product was about 15,000.

*Example 4*

The same process in Example 2 was utilized in preparing a 10% modified vinylnylon, the proportions being chosen to provide 10 mole percent of the adipic acid moiety with the β-vinyl substituent. In this run, 17.2 g. (0.10 mole) of β-vinyladipic acid and 131.5 g. (0.90 mole) of adipic acid were combined with 118.4 g. (1.02 moles) hexamethylene diamine.

The salt was dried in a vacuum oven at 70° C. and weighed 240.1 g., which represented at 91% yield.

After converting the salt to the nylon by heating at 530° F. for about 5 to 7 hours, the resultant polymer showed a molecular weight of 26,000, and a melting point of 256° C. This product was not completely soluble in formic acid, indicating that some cross-linking had occurred. The high molecular weight can probably be ascribed to the slight amount of cross-linking. The solid linear polyamide product had a formula:

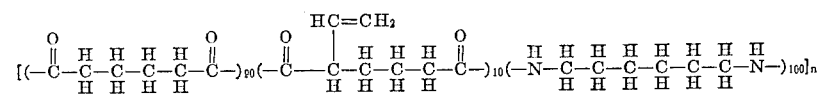

*Example 5*

A 20% vinylnylon was prepared as discussed in Example 2 by using 34.4 g. (0.20 mole) of β-vinyladipic acid and 116.90 g. (0.80 mole) of adipic acid with 118.4 g. of hexamethylene diamine (1.02 moles). The salt which was obtained weighed 248.0 g.

After conversion to the vinylnylon, a molecular weight determination indicated a molecular weight of about 10,000. The solid linear polyamide product had the formula:

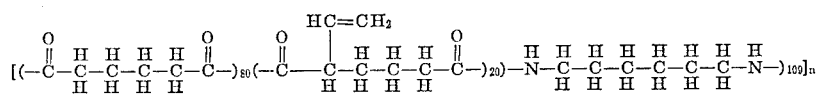

*Example 6*

An attempt to prepare a 50% modification of the vinylnylon was made by using 45.6 g. of β-vinyladipic acid (0.265 mole) with 38.7 g. of adipic acid (0.265 mole) with 64.5 g. (0.555 mole) of hexamethylene diamine.

A solution of the β-vinyladipic acid and adipic acid in 850 ml. of isopropanol was prepared in a 200 ml. creased flask equipped with a reflux condenser, a mechanical stirrer, a dropping funnel, and a nitrogen inlet. A solution of 64.5 g. of hexamethylene diamine in 250 ml. of isopropanol was added by means of the dropping funnel. The reaction mixture was stirred and cooled with an ice bath for one hour and then filtered with suction.

The resulting salt was washed twice with 260 ml. of cold isopropanol and dried in a vacuum oven at 65° C. overnight to yield 132.9 g. (91%) of the salt.

A mixture of 50% hexamethylenediammonium β-vinyladipate (130 g.), hexamethylene diamine (1.3 g.), and water (75 g.) was charged to a glass liner and heated to 530° F. After a reaction time of 6.5 hours, the product was discovered to be cross-linked as shown by its insolubility in formic acid. No melting point was determined, the material decomposing at about 440° C.

*Example 7*

A 100% modified β-vinylnylon was prepared by first reacting β-vinyladipic acid with thionyl chloride in order to obtain the diacid chloride. A mixture of 3.0 g. of hexamethylene diamine, 4.0 g. of 50 weight percent sodium hydroxide, 20 ml. of 5% aerosol solution, 25 ml. of methylene chloride, and 150 ml. of ice water was prepared in a blender. To this mixture was added in one portion a solution of β-vinyladipyl chloride (4.0 g.) in 25 ml. of methylene chloride. The blender was stirred during addition, and stirring was continued for 5 minutes. The reaction mixture was then poured into 1000 ml. of distilled water.

The resulting mixture was digested on a steam bath for two hours to remove methylene chloride. The resulting mixture was filtered, yielding a solid which was washed twice with 250 ml. of water and then filtered. The filtered solid was dried overnight in a vacuum oven at 65° C. to yield a solid weighing 3.72 g., which represented 74% yield. The solid decomposed without melting when heated in air. In an evacuated sealed tube, the solid melted at 150° C. to 155° C. The melting point as determined by differential thermal analysis under nitrogen was 192° C. This polymer was submitted for NMR (nuclear magnetic resonance) and X-ray analyses. NMR analysis confirmed the presence of pendant vinyl groups, while X- ray analysis showed a partially crystalline structure. A solid linear polyamide product had the formula:

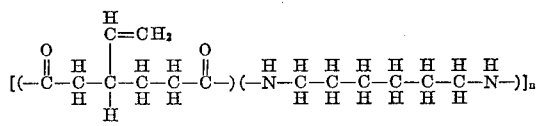

The molecular weight was about 17,000.

*Example 8*

A series of adhesion tests were performed to compare the adhesive characteristics of vinylnylons with those of unmodified nylons 66. Samples were prepared by forming sandwiches of 4 mil vinylnylon and nylon film between two layers of one-eighth inch butyl rubber. The butyl rubber was compounded with 50 parts of channel black, 5 parts of zinc oxide, 3 parts of stearic acid, 2 parts of sulfur, 1 part of tetramethylthiuram disulfide, and 0.5 part benzothiazyl disulfide per 100 parts butyl in order to promote vulcanization, and all samples were submitted to vulcanizing conditions (307° F. for 40 minutes in a mold closed at 1200 p.s.i.).

Certain of the nylon films were blended with zinc oxide to promote the cross-linking of the modified nylons with the rubber.

The samples were pulled apart using an Instron machine which features movable jaws and records the force necessary to pull the sample apart at a constant speed of jaw travel. The rubber pads were attached to the Instron jaws, and the samples were peeled apart at the rubber-nylon interface.

Figure 2:
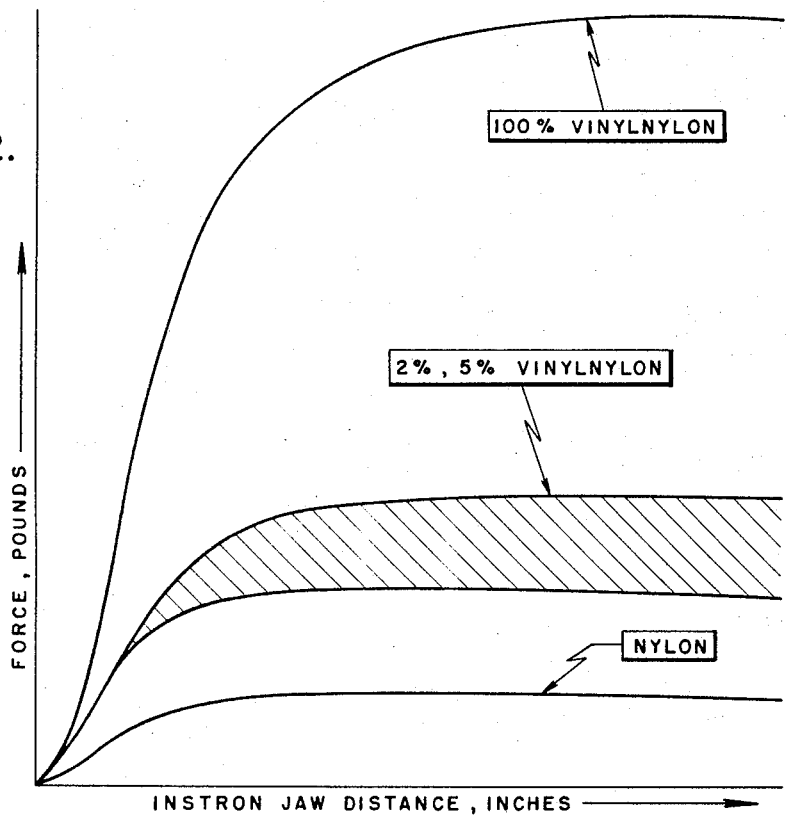
Figure 3:
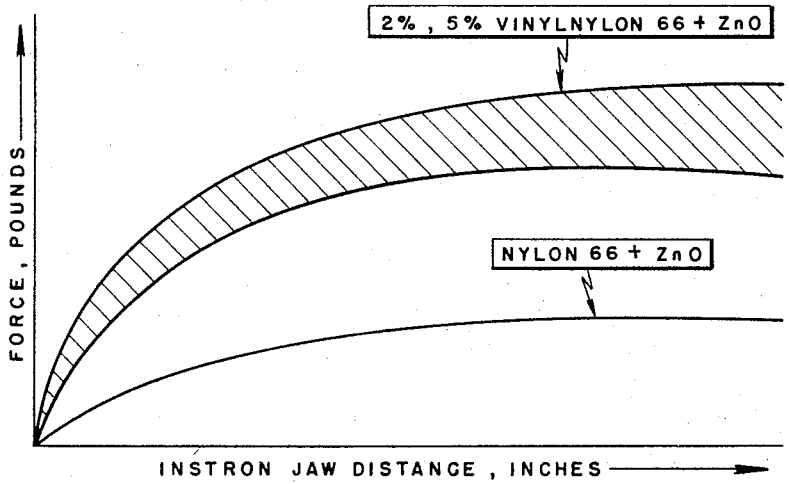
FIG. 3 shows similar values when zinc oxide was added to the unmodified nylon in an attempt to promote cross-linking with the butyl rubber. No effect was noted.

The results of these tests are shown schematically in FIGS. 2 and 3. In FIG. 2, the adhesion curves of vinylnylons with butyl rubber are shown. These nylon films were compounded without zinc oxide. As is seen from FIG. 2, the 100% vinylnylon provides about ten times the adhesion with butyl rubber as is obtained with the unmodified nylon. The 2% and 5% modified nylons exhibited characteristics which fell generally in the cross-hatched area, exhibiting from two to three times as much adhesion as is obtained by the unmodified nylon. Thus, it is seen that the pendant vinyl groups in the modified nylons of the present invention provide added adhesive qualities for use in conjunction with butyl rubber. This is a valuable improvement for uses such as tire cord.

FIG. 3 shows the adhesion curves of vinylnylons blended with zinc oxide, using butyl pads or butyl sandwiches as in FIG. 2. As will be seen by FIG. 3, the 2% and 5% modified β-vinylnylon 66 showed roughly twice the adhesion of the unmodified nylon 66.

By comparison of FIGS. 2 and 3, it is noted that the zinc oxide had no appreciable effect on the adhesive qualities, either of the base case nylon or of the modified nylons. The modified nylons remained superior in adhesive qualities.

Having disclosed the essence of my invention and having set forth the preferred modes of practicing it, what is to be covered by Letters Patent should be limited not by the specific examples herein given, but only by the scope of the appended claims.

I claim:

1. A solid linear polyamide of adipic acid, β-vinyladipic acid, and hexamethylene diamine of the formula:

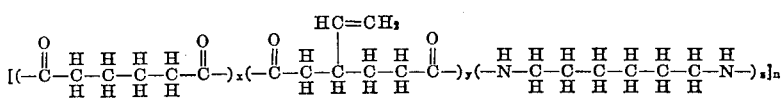

wherein $(x+y)$ is substantially equal to $z$;
$x$ is from 50 to 98% of $(x+y)$;
$y$ is from 2 to 50% of $(x+y)$; and
$n$ is from 50 to 120.

2. A solid linear polyamide of adipic acid, β-vinyladipic acid, and hexamethylene diamine of the formula:

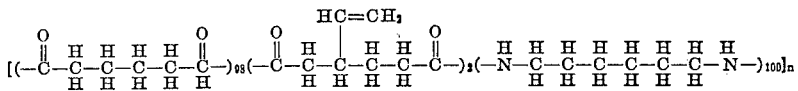

wherein $n$ is from 50 to 120.

3. A solid linear polyamide of adipic acid, β-vinyladipic acid, and hexamethylene diamine of the formula:

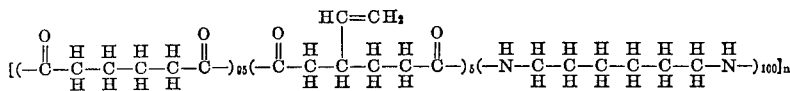

wherein $n$ is from 50 to 120.

4. A solid linear polyamide of adipic acid, β-vinyladipic acid, and hexamethylene diamine of the formula:

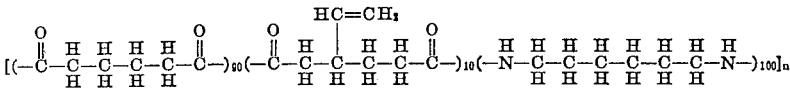

wherein $n$ is from 50 to 120.

5. A solid linear polyamide of adipic acid, β-vinyladipic acid, and hexamethylene diamine of the formula:

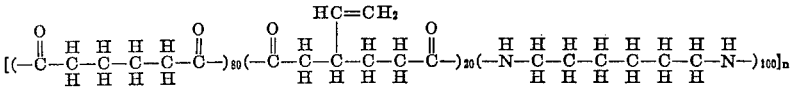

wherein n is from 50 to 120.

6. A solid linear polyamide of adipic acid, β-vinyladipic acid, and hexamethylene diamine of the formula:

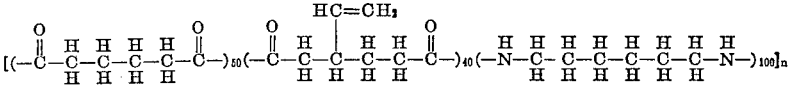

wherein $n$ is from 50 to 120.

No references cited.

WILLIAM H. SHORT, *Primary Examiner.*

H. D. ANDERSON, *Assistant Examiner.*